United States Patent [19]

Kasuga

[11] Patent Number: 5,496,993
[45] Date of Patent: Mar. 5, 1996

[54] OPTICAL PICKUP DEVICE WITH WEDGE SHAPED AND CONCAVE LENS FOR CORRECTING A COMA AND ASTIGMATISM

[75] Inventor: Ikuo Kasuga, Nagano, Japan

[73] Assignee: Kabushiki Kaisha Sanko Seiki Seisakusho, Nagano, Japan

[21] Appl. No.: 95,193

[22] Filed: Jul. 23, 1993

[30] Foreign Application Priority Data

Jul. 25, 1992 [JP] Japan ............... 4-057841 U

[51] Int. Cl.⁶ ........................... G02B 7/04
[52] U.S. Cl. .................. 250/201.5; 369/44.23; 359/719
[58] Field of Search ............ 250/201.5; 359/637, 359/737, 708, 719, 720; 369/44.11, 44.21, 44.22, 44.23

[56] References Cited

U.S. PATENT DOCUMENTS

| | | | |
|---|---|---|---|
| 4,778,984 | 10/1988 | Nakamura | 250/201 |
| 4,805,992 | 2/1989 | Maeda | 350/286 |
| 4,886,959 | 12/1989 | Hoshi et al. | 250/201 |
| 4,968,874 | 11/1990 | Kasuga . | |
| 5,272,685 | 12/1993 | Ando | 360/44.14 |
| 5,305,074 | 4/1994 | Feldman | 356/345 |

FOREIGN PATENT DOCUMENTS

| | | |
|---|---|---|
| 61-202339 | 9/1986 | Japan . |
| 62-159354 | 12/1987 | Japan . |
| 1302548 | 12/1989 | Japan . |

*Primary Examiner*—Edward P. Westin
*Assistant Examiner*—Steven L. Nichols
*Attorney, Agent, or Firm*—Sughrue, Mion, Zinn, Macpeak & Seas

[57] ABSTRACT

Disclosed is an optical pickup device comprising a light source for irradiating a light beam onto an object from a light source, a half mirror for introducing said light beam reflected by the object to an optical detector; and a wedge-shaped photosensitive element, disposed between said half mirror and said optical detector, for cancelling out a coma produced by said half mirror.

5 Claims, 1 Drawing Sheet

5,496,993

OPTICAL PICKUP DEVICE WITH WEDGE SHAPED AND CONCAVE LENS FOR CORRECTING A COMA AND ASTIGMATISM

BACKGROUND OF THE INVENTION

1. Field of the invention

The invention relates to an optical pickup system that irradiates a light beam from a light source to an object through a half mirror and introduces the light beam reflected by the object to an optical detector through the half mirror.

2. Prior art

Optical pickup systems are designed to produce astigmatism of an arbitrary magnitude in a predetermined direction in order to detect a focusing error of an objective lens for an object, and effect focusing control of the objective lens by utilizing the fact that the section of the luminous flux is substantially circular at the focal point. Known as a means for producing astigmatism are a method of disposing a cylindrical lens along an optical path and a method of arranging a half mirror so as to be inclined relative to the optical axis. Exemplary methods of arranging a half mirror so as to be inclined relative to the optical axis are disclosed in Japanese Patent Unexamined Publications Nos. 202339/1986 and 302548/1989. These methods are designed to correct a coma since the coma is produced together with an astigmatism when the half mirror is arranged so as to be inclined relative to the optical axis. The methods disclosed in the above-described publications will be outlined below.

The method proposed in the above publication No. 202339/1986 is such that the half mirror is arranged so as to be inclined relative to the optical axis and that another optical member is arranged so as to be inclined relative to the optical axis. This is a design to correct the coma by the interaction of the half mirror and the other optical member. The half mirror and another optical member are formed of parallel flat plates or concave or convex surfaces.

FIGS. 3 and 4 outline the above publication No. 302548/1989; and FIG. 4 is a side view as viewed from a side of a totally reflecting mirror 4 in FIG. 3. In FIGS. 3 and 4, a laser beam from a laser light source 1 passes through a diffraction grating 2, is reflected by a half mirror 3, and converges onto an optical disk 6, which is a symmetrical object, by an objective lens 5 via the totally reflecting mirror 4. The reflected beam from the optical disk 6 reaches an optical element 8 after having passed through the objective lens 5 and the mirror 4, passing through the half mirror 3, and passing through a correcting lens 7. The correcting lens 7 is made of a glass or plastic material, and has an anisotropically curved surfaces R1 and R2 on the half mirror 3 side and the optical element 8 side, respectively. The anisotropically curved surface R1 is such a cylindrical surface as to produce astigmatism in a direction of cancelling out the astigmatism produced by luminous flux having passed through the half mirror 3. The other anisotropically curved surface R2 is such a toric or toroidal surface as to produce astigmatism in an arbitrary direction and set the magnification of imaging on the surface of the optical element 8 to a predetermined value. In order to cancel out the effect of the coma produced by the half mirror 3, an optical axis S—S of the correcting lens 7 is inclined by Φ relative to an optical axis X—X.

According to the method disclosed in the publication No. 202339/1986, it is so designed that a coma produced by the half mirror disposed so as to be inclined relative to the optical axis is cancelled out by a coma produced by the parallel flat plate or lens arranged so as to be inclined relative to the optical axis. Thus, in order to effectively cancel out the coma produced by the half mirror, the angle of inclination of the optical element such as the parallel plate or lens must be large, and as a result the optical element is difficult to fabricate with the dimension thereof in the direction of the optical axis becoming large. Further, since the angle of inclination of the optical element must be large relative to the mounting frame, thereby making the dimensional control difficult when the optical element is made by resin molding or the like. Still further, since the angle of inclination of the optical element relative to the optical axis is large, the optical path for the light beam transmitting the optical element becomes long, which imposes the problems such as being disadvantageous in downsizing the optical pickup system, making the loss of light large, or greatly impairing the transmitted light due to inconsistency of the media.

Also in the method proposed in the above-described publication No. 302548/1989, the optical axis of the correcting lens 7 must be inclined in accordance with the curvature of the correcting lens 7 in order to cancel out the effect of a coma produced by the half mirror 3. Depending on the design condition of the optical system, the angle of inclination of the correcting lens 7 must be large in order to cancel out a coma produced by the half mirror 3 effectively. Thus, the same problem is encountered by the method proposed in the publication No. 202339/1986.

SUMMARY OF THE INVENTION

The invention has been made to overcome these conventional problems. Accordingly, an object of the invention is to provide an optical pickup system which is capable of decreasing the dimension of the optical element in the direction of the optical axis in order to cancel out a coma produced by the half mirror, thereby facilitating the fabrication of the optical element and improving dimensional control in resin molding or the like, and which is capable of shortening the optical path of the transmitted light of the optical element, thereby contributing to downsizing the optical pickup, reducing the loss of light, and preventing the deterioration of the transmitted light due to inconsistency of the media.

According to the aspect of the present invention, an optical pickup device comprises a light source for irradiating a light beam onto an object from a light source, a half mirror for introducing said light beam reflected by the object to an optical detector; and a wedge-shaped optical element, disposed between said half mirror and said optical detector, for cancelling out a coma produced by said half mirror.

According to the present invention, the wedge-shaped optical element for cancelling out a comatic aberration produced by the half mirror is disposed between the half mirror and the optical detector. As a result, the angle of inclination of the surface of the wedge-shaped optical element for cancelling out the comatic aberration produced by the half mirror can be set to a small angle, thereby providing the advantages of not only allowing the dimension of the wedge-shaped optical element in the direction of the optical axis to be short, but also facilitating the fabrication of the wedge-shaped photosensitive element. Further, the wedge-shaped optical element is disposed so as to be increasingly perpendicular to the mounting frame, thereby providing the advantages of not only allowing itself to be downsized, but also contributing to better accuracy control in resin molding or the like. Still further, the angle of inclination of the surface of the wedge-shaped optical element is small, thereby providing the advantages of not only making the optical path of a transmitted light short and allowing optical pickups to be downsized, but also contributing to curtailing the loss of light and reducing impairment of the transmitted light due to inconsistency of the medium.

According to the present invention, the wedge-shaped optical element having a surface in which a wedge form and a cylindrical form are combined. As a result, not only an astigmatism produced by the half mirror can be cancelled out by the cylindrical form of the surface, but also a comatic aberration produced by the half mirror can be corrected by the wedge form of the surface.

DETAILED DESCRIPTION OF THE PREFERRED EMBODIMENTS

Optical pickup systems, which are embodiments of the invention, will now be described with reference to FIGS. 1 and 2.

Figure 1:
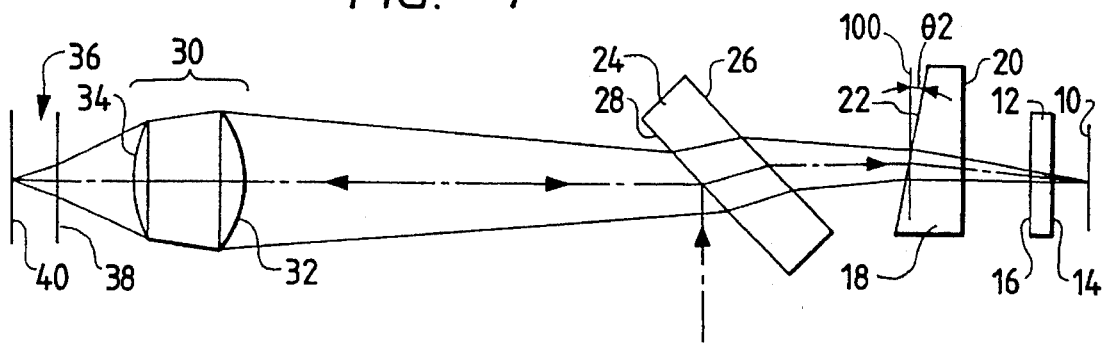
FIG. 1 is a diagram showing the configuration of an optical system, which is an embodiment of the invention.

In FIG. 1, reference numeral 24 designates a half mirror. The half mirror, having surfaces 26 and 28 that are parallel with each other, is arranged so that these surfaces 26, 28 are inclined by 45° in FIG. 1. One 28 of the surfaces of the half mirror 24 is semi-transparent. This transparent surface is designed to reflect a light beam from a not shown laser light source in a left direction. The light beam reflected by the surface 28 of the half mirror 24 passes through a surface 38 of an optical disk 36, which is an object to be scanned, by passing through an objective lens 30 having aspherical surfaces 32 and 34 and converges on a recording track 40 of the optical disk 36.

The light beam reflected by the recording track 40 of the optical disk 36 goes back to the objective lens 30 and reaches a wedge-shaped optical element 18 after having passed through the half mirror 24. The wedge-shaped optical element 18 has two surfaces 22 and 20 forming a wedge. Out of these surfaces 22 and 20, the surface 22 arranged on the half mirror 24 side is inclined by an angle θ2 relative to an axis 100 at right angles with the optical axis, and is inclined in a direction diametrically opposite to the direction of inclination of the half mirror 24. The other surface 20 is also disposed at right angles with the optical axis. The feature of the embodiment is the wedge-shaped optical element 18 having such a structure. The light beam having passed through the wedge-shaped optical element 18 then reaches the optical detector 10 by passing through a cover glass 12 that has parallelly arranged surfaces 16 and 14. The cover glass 12 is made of, e.g., an epoxy resin. As known well, the optical detector 10 has quartered light receiving surfaces and outputs a focusing signal or a tracking signal depending on the quantity of light received by each light receiving surface.

In the above-described embodiment, the half mirror 24 is disposed while inclined substantially 45° relative to the optical axis. Accordingly, astigmatism is produced in directions substantially 45° relative to lines of division of the respective light receiving surfaces of the optical detector 10, so that a detection output of the optical detector 10 can be supplied for focusing control. While the astigmatism is produced by disposing the half mirror 24 so as to be inclined, so is a coma. If the coma is produced and injected into the optical detector 10 as it is without any further processing, the horizontal sectional profile of the light beam injected into the optical detector 10 is broken, thus impairing focusing and tracking control accuracy. However, in the embodiment shown in FIG. 1, the coma is cancelled out by the wedge-shaped optical element 18 disposed between the half mirror 24 and the optical detector 10. More specifically, since the wedge-shaped optical element 18 is arranged so as to be inclined by the angle 82 relative to the axis 100 at right angles with the optical axis of the surface 22 of the half mirror 24 side and inclined in the direction diametrically opposite to the direction of inclination of the half mirror 24, the surface 22 produces a coma that is directed diametrically opposite to the direction of the coma having been produced by the half mirror 24, thus cancelling out the coma that has been produced by the half mirror 24. Accordingly, the horizontal sectional profile of the light beam injected into the optical detector 10 is kept normal, so that high focusing and tracking control accuracy can be maintained.

In the above-described embodiment, the angle of inclination θ2 of the surface 22 of the wedge-shaped optical element 18 for cancelling out the coma caused by the half mirror 24 may be set to an extremely small value, such as, e.g., 8°, which provides the advantage of allowing the dimension of the wedge-shaped optical element 18 in the direction of the optical axis to be short, thereby facilitating the fabrication of the wedge-shaped optical element 18. Further, the wedge-shaped optical element 18 is disposed so as to be increasingly perpendicular to the mounting frame, thereby not only allowing itself to be downsized, but also achieving accurate dimensional control in the case of resin molding or the like. Still further, the short angle of inclination of the surface 22 allows an optical path for the transmitted light to be short, thereby contributing to downsizing the optical pickup or curtailing the loss of light or reducing impairment of the transmitted light due to inconsistency of the media.

According to the embodiment described above, the both surfaces of the wedge-shaped optical element for correcting coma are designed flat. Such an arrangement may be applicable if the surfaces are employed only to correct coma caused by the half mirror. However, to give functions other than correcting coma, a combination of a wedge form and a cylindrical form may be applied to forming the wedge-shaped optical element.

Figure 2:
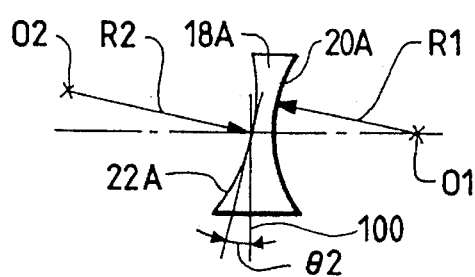
FIG. 2 is a side view showing a modified example of a wedge-shaped optical element applicable to the optical pickup system of the invention.
Figure 4:
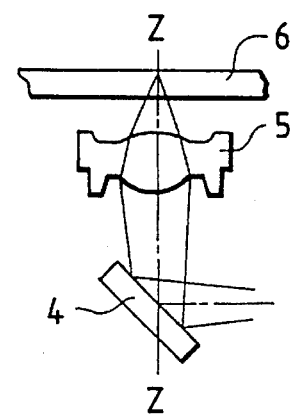
FIG. 4 is a diagram showing the configuration in the vicinity of an object lens of the conventional example.
Figure 3:
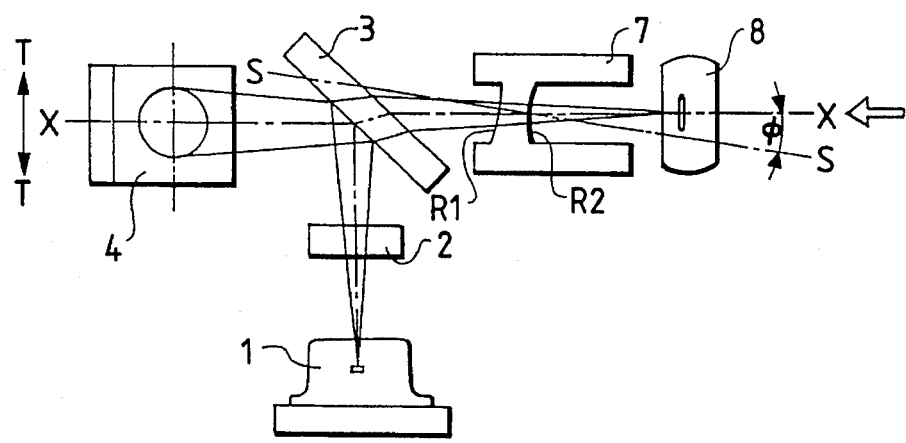
FIG. 3 is a diagram showing the configuration of a conventional optical pickup.

FIG. 2 shows a modified example of such a wedge-shaped optical element, which can replace the wedge-shaped optical element 18 in the embodiment shown in FIG. 1. In FIG. 2, the wedge-shaped optical element 18A has a concave cylindrical surface 22A on the surface of the half mirror 24 side and a concave cylindrical surface 20A on the surface of the optical detector 10 side. However, since the center O of the cylindrical surface 22A is located at a position shifted from the optical axis, the cylindrical surface is formed by a combination of a wedge form inclined by an angle θ2 relative to the axis 100 right angles to the optical axis with a cylindrical form. The curvature of the cylindrical surface 22A is infinite in a direction perpendicular to the sheet in FIG. 2. An astigmatism produced by the half mirror 24 can be cancelled out by the cylindrical surface 22A, and a coma produced by the half mirror 24 can be corrected by the angle of inclination θ2 of the cylindrical surface 22A.

On the other hand, the center O1 of the cylindrical surface 20A stays on the optical axis, and the cylindrical surface 20A is rotated by 45° relative to the direction perpendicular to the sheet within a surface perpendicular to the direction of the sheet surface, so that an astigmatism for detecting a focusing error can be produced in a direction of rotation by 45° relative to the direction of the astigmatism produced by the half mirror 24.

The use of the wedge-shaped optical element 18A having a combination of such wedge and cylindrical forms as shown in FIG. 2 not only allows the astigmatism produced by the half mirror 24 to be cancelled out by the cylindrical surface 22A, but also allows the coma produced by the half mirror 24 to be corrected by the angle of inclination θ2 of the cylindrical surface 22A. By inclining the cylindrical surface 20A of the opposite side of the wedge-shaped photosensitive element 18A relative to the optical axis, an astigmatism more suitable for focusing error detection can be newly produced.

In the conventional art, when astigmatism produced by the half mirror was used for focusing detection, the thickness of the mirror and the focusing detection characteristics were clearly defined. Therefore, the shortcomings that restrictions were imposed upon the structural design of the optical pickup and that detection characteristics were not optimal were addressed. However, such shortcomings can also be overcome.

According to the first aspect of the invention, the wedge-shaped optical element for cancelling out a coma produced by the half mirror is disposed between the half mirror and the optical detector. As a result, the angle of inclination of the surface of the wedge-shaped optical element for cancelling out the coma produced by the half mirror can be set to a small angle, thereby providing the advantages of not only allowing the dimension of the wedge-shaped optical element in the direction of the optical axis to be short, but also facilitating the fabrication of the wedge-shaped optical element. Further, the wedge-shaped optical element is disposed so as to be increasingly perpendicular to the mounting frame, thereby providing the advantages of not only allowing itself to be downsized, but also contributing to better accuracy control in resin molding or the like. Still further, the angle of inclination of the surface of the wedge-shaped optical element is small, thereby providing the advantages of not only making the optical path of a transmitted light short and allowing optical pickups to be downsized, but also contributing to curtailing the loss of light and reducing impairment of the transmitted light due to inconsistency of the medium.

According to the second aspect of the invention, the wedge-shaped optical element having a surface in which a wedge form and a cylindrical form are combined. As a result, not only an astigmatism produced by the half mirror can be cancelled out by the cylindrical form of the surface, but also a coma produced by the half mirror can be corrected by the wedge form of the surface.

What is claimed is:

1. An optical pickup device comprising:

a light source for irradiating a light beam onto an object from a light source;

a half mirror for introducing the light beam reflected by the object to an optical detector; and a wedge-shaped optical element, disposed between said half mirror and said optical detector, for cancelling out a coma produced by said half mirror, wherein said wedge-shaped optical element has a surface formed by combining a wedge form and a cylindrical form, and wherein said surface of said wedge-shaped optical element on said half mirror side is a concave cylindrical surface.

2. An optical pickup system according to claim 1, wherein a center of the concave cylindrical surface on said half mirror side is located at a position shifted from the optical axis.

3. An optical pickup system according to claim 1, wherein the center of said concave cylindrical surface on said optical detector side is located on said optical axis.

4. An optical pickup device comprising:

a light source for irradiating a light beam onto an object from a light source;

a half mirror for introducing the light beam reflected by the object to an optical detector; and a wedge-shaped optical element, disposed between said half mirror and said optical detector, for cancelling out a coma produced by said half mirror, wherein said wedge-shaped optical element has a surface formed by combining a wedge form and a cylindrical form, and wherein said surface of said wedge-shaped optical element on said optical detector side is a concave cylindrical surface.

5. An optical pickup device comprising:

a light source for irradiating a light beam onto an object from a light source;

a half mirror for introducing said light beam reflected by the object to an optical detector; and a wedge-shaped optical element, disposed between said half mirror and said optical detector, for cancelling out a coma produced by said half mirror, wherein said wedge-shaped optical element has a surface formed by combining a wedge form and a cylindrical form.

* * * * *